United States Patent
Galgano

(10) Patent No.: US 7,532,258 B1
(45) Date of Patent: May 12, 2009

(54) VIDEO REMOTE CONTROLLER INCORPORATING AUDIO SPEAKER AND SPEAKER VOLUME CONTROL

(76) Inventor: Michael Galgano, 61 S. Main St., New City, NY (US) 10956

( * ) Notice: Subject to any disclaimer, the term of this patent is extended or adjusted under 35 U.S.C. 154(b) by 544 days.

(21) Appl. No.: 11/220,309

(22) Filed: Sep. 6, 2005

(51) Int. Cl.
H04N 5/44 (2006.01)

(52) U.S. Cl. ........................ 348/734; 348/632
(58) Field of Classification Search ................ 348/734, 348/632; 725/40, 50
See application file for complete search history.

(56) References Cited

U.S. PATENT DOCUMENTS

| 2,255,390 | A | | 9/1941 | Martin |
|---|---|---|---|---|
| 4,375,651 | A | * | 3/1983 | Templin et al. ............. 348/731 |
| 4,386,371 | A | | 5/1983 | George |
| 4,549,179 | A | | 10/1985 | Stendardo |
| 5,001,774 | A | | 3/1991 | Lee |
| 5,189,517 | A | * | 2/1993 | Ohara ........................ 348/734 |
| 5,495,201 | A | * | 2/1996 | Alini et al. .................. 327/563 |
| 5,495,301 | A | | 2/1996 | Mudra |
| 5,502,513 | A | | 3/1996 | Mudra |
| 5,794,127 | A | | 8/1998 | Lansang |
| 2004/0168187 | A1 | * | 8/2004 | Chang ........................ 725/40 |

FOREIGN PATENT DOCUMENTS

| JP | 60157398 | 8/1985 |
|---|---|---|
| JP | 62287777 | 12/1987 |
| JP | 7283964 | 10/1995 |
| JP | 2001186578 | 7/2001 |
| WO | WO01/47258 | 6/2001 |

* cited by examiner

Primary Examiner—M. Lee
(74) Attorney, Agent, or Firm—Michael I Kroll

(57) ABSTRACT

A volume control system for use with an audio-visual component able to receive an input signal having an audio signal and a video signal is disclosed. The system includes a remote control unit having a speaker positioned thereon for outputting an audio signal therefrom. The remote control further includes means for generating a request signal in response to user command for disabling an output of audio signal by the component. The generated request signal is transmitted to the component and means positioned within the component receives the request signal and disables the audio output. The audio signal is transmitted for receipt by a receiving means in the remote control unit and is output on the speaker of the remote control.

8 Claims, 8 Drawing Sheets

VIDEO REMOTE CONTROLLER INCORPORATING AUDIO SPEAKER AND SPEAKER VOLUME CONTROL

BACKGROUND OF THE INVENTION

1. Field of the Invention

The present invention relates generally to remote controls and, more specifically, to a remote control for an audio/video device, such as a television. The remote control has an audio circuit for receiving a wireless broadcast of an audio signal associated with at least one of a selected video program from the video monitor and selected audio program from an audio output device. Actuation of a button disables the relay of the audio signal through an output device and instead reroutes the signal to the remote control. The remote control includes a speaker to output the rerouted signal to the user, thus allowing for more private listening. The volume of the audio signal being transmitted through the speaker can be changed by the remote control. The remote control also includes an aperture for insertion of an earpiece, which upon insertion of an earpiece, causes the rerouted audio signal to be output to the earpiece.

2. Description of the Prior Art

There are other speaker devices designed for signal reception. Typical of these is U.S. Pat. No. 2,255,390 issued to Martin on Sep. 9, 1941 and U.S. Pat. No. 4,386,371 issued to George on May 31, 1983

Another patent was issued to Stendardo on Oct. 22, 1985 as U.S. Pat. No. 4,549,179. Yet another U.S. Pat. No. 5,001,774 was issued to Lee on Mar. 19, 1991 and still yet another was issued on Feb. 27, 1996 to Mudra as U.S. Pat. No. 5,495,301.

Another patent was issued to Mudra on Mar. 26, 1996 as U.S. Pat. No. 5,502,513. Yet another U.S. Pat. No. 5,794,127 was issued to Lansang on Aug. 11, 1998. Another was issued to Toyoaki on Aug. 17, 1985 as Japanese Patent No. JP60157398 and still yet another was issued on Dec. 14, 1987 to Katsuaki as Japanese Patent No. JP6228777.

Another patent was issued to Masaaki on Oct. 27, 1995 as Japanese Patent No. JP7283964. Yet another Japanese Patent No. JP2001186578 was issued to Young-min Kim on Jul. 6, 2001 and still yet another was issued on Jun. 28, 2001 to Kaufman as International Patent Application No. WO01/47258.

U.S. Pat. No. 2,255,390

Inventor: Herschel B. Martin

Issued: Sep. 9, 1941

A dual volume control system for a radio receiver comprising means including a direct current grid biasing source for establishing a normal gain ratio in certain amplifier stages of said receiver, a voltage divider of relatively high ohmic value having its terminals resistively connected across the terminals of said source and having a movable tap connected to the grids of said amplifier stages, a voltage divider of relatively low ohmic value having its terminals connected to corresponding terminals of the first said voltage divider and having a movable tap, the two said voltage dividers being respectively located at separate control stations, a single pole-double-throw switch at each control station, each said switch having a movable contact member connected to an adjacent one of said movable taps on the voltage dividers, and conductors interconnecting corresponding stationary contact members of the two said switches, said switches constituting means for at times interconnecting the movable taps of said voltage dividers.

U.S. Pat. No. 4,386,371

Inventor: John B. George

Issued: May 31, 1983

In a wired remote control for use with a television receiver, audio signals are coupled to a loudspeaker by a transformer providing electrical isolation. The remote control device comprises an oscillator applying a signal at a frequency above the audio range to the transformer and a rectifier at the transformer secondary converting the oscillator signal to a DC signal. That DC signal is selectively applied by a switch to an optocoupler which couples to a control device for controlling the audio source. A filter blocks the oscillator signal from the speaker. Additionally, the control device controls TV channel selection.

U.S. Pat. No. 4,549,179

Inventor: William J. Stendardo

Issued: Oct. 22, 1985

A self-contained remote control unit for use on electronic equipment processing on audio output such as home entertainment equipment (i.e. a television receiver, whether black and white or color, an AM radio, an FM radio, an AM/FM radio, or an audio magnetic tape player) comprises an externally mounted remote control receiver which connects to the home entertainment equipment through the earphone connector of said equipment and thereby disables the speakers of said equipment. The remote control receiver unit includes its own speaker, which replaces the disabled internal speaker of the equipment to be controlled, a programmable audio power amplifier for driving its speaker, and an on/off triac which supplies AC power to the equipment to be controlled when said equipment's AC power cable is connected to an AC receptacle on the receiver. A battery-operated, hand-held, hand-operated remote control transmitter is used to send wireless information to the remote control receiver. The remote control transmitter unit includes a keyboard, a remote control encoder, and an output circuit.

U.S. Pat. No. 5,001,774

Inventor: Kyu-An Lee

Issued: Mar. 19, 1991

A remote control circuit for remotely controlling a power source and a volume of a main set from a stereo-headphone composed of a remote control transmitting circuit arranged in a headphone, and a remote control receiving circuit arranged in a mainset.

U.S. Pat. No. 5,495,301

Inventor: Robert E. Mudra

Issued: Feb. 27, 1996

A full function remote control pillow speaker arrangement is coupled by three wires to a television receiver. The arrangement includes a standard IR control signal encoder, the output of which is filtered to remove the 40 kilohertz ultrasonic frequency, thus yielding an envelope corresponding to the data pulses. Operating power is supplied to the encoder from a DATA line and a common (COM) line with a shunt regulator being interposed to protect the encoder from over voltage conditions during standby operations. A speaker is supplied audio signals from the (COM) line and an audio line. The receiver is capable of functioning with other types of pillow speaker control units, i.e. those having a single key closure for channel and on/off control and those with extra key closures for channel directional control. A circuit is included that discriminates between data pulses and key closures for transmitting data pulses to the television receiver IR data processing circuitry and transmitting key closures to receiver key scan processing circuitry.

U.S. Pat. No. 5,502,513

Inventor: Robert E. Mudra

Issued: Mar. 26, 1996

A full function remote control pillow speaker arrangement is coupled by three wires to a television receiver. The arrangement includes a standard IR control signal encoder, the output of which is filtered to remove the 40 kilohertz ultrasonic frequency, thus yielding an envelope corresponding to the data pulses. Operating power is supplied to the encoder from a DATA line and a common (COM) line with a shunt regulator being interposed to protect the encoder from over voltage conditions during standby operations. A speaker is supplied audio signals from the COM line and an AUDIO line. The receiver is capable of functioning with other types of pillow speaker control units, i.e. those having a single key closure for channel and on/off control and those with extra key closures for channel directional control. A circuit is included that discriminates between data pulses and key closures for transmitting data pulses to the television receiver IR data processing circuitry and transmitting key closures to receiver key scan processing circuitry.

U.S. Pat. No. 5,794,127

Inventor: Wilfredo Lansang

Issued: Aug. 11, 1998

A new Headphone Remote Control for Operating an Entertainment Center for offering a headphone with a fully equipped remote control for privately operating and controlling an entertainment center. The inventive device includes an antenna receiver, a channel selector control, a locator speaker, a locator over-ride circuit, a pressure switch, and a head phone transmitter. In use, the Headphone Remote Control for Operating an Entertainment Center 10 is located by clapping one's hands together. When the device is found and placed upon one's head, the pressure switch 28 de-energizes the locator speaker 24 and can selectively energize the vibrator signal 25 which will signal the user when someone wants their attention. While wearing the device, for example, the user is able to watch and listen to the TV while others around him do not hear the TV, but rather, others can concurrently listen to the STEREO instead.

Japanese Patent Number JP60157398

Inventor: Inuma Toyoaki

Issued: Aug. 17, 1985

PURPOSE: To specify position of the body of a remote control device by making a switch provided in a body operated by the body of a remote control device to emit feeble radio waves, and making the body of the remote control device to receive the feeble radio waves and generate an acoustic signal.

CONSTITUTION: The body of the remote control device 15, a container 12 and a switch 13 are provided in front of a body, for instance a television 10, to be operated by the body of the remote control device 15. The body of the remote control device 15 is taken out from the container 12, and the television set 10 is remote controlled by controlling off/on of a power source, and operating a volume adjusting switch (b) and channel selection switches 1-12. When the switch 13 of the television set 10 is depressed, feeble radio waves are emitted. The body of the remote control device 15 detect this and generates an acoustic signal from a speaker 17 and informs of the position of presence. Thus, unknown position of the body of the remote control device 15 can be found easily.

Japanese Patent Number JP62287777

Inventor: Shiba Katsuaki

Issued: Dec. 14, 1987

PURPOSE: To hear a television sound from a remote control device by providing a speaker at the remote control device.

CONSTITUTION: In a remote control device 3 to execute the remote control of a television device 1, a speaker 3 is provided on the same surface as the operating surface. Thus, the television sound received by the television device 1 can be heard from the speaker 3 of the remote control device 1.

Japanese Patent Number JP7283964

Inventor: Ohama Masaaki

Issued: Oct. 27, 1995

PURPOSE: To enjoy television broadcasting without bothering neighbors by incorporating a speaker in a remote control and emitting the sound of a broadcast station received by a television receiver.

CONSTITUTION: The output side of a low frequency amplifier circuit 10 is connected to a remote control with built-in speaker 15 by switching a speaker connection switching circuit 12. The power source connection/disconnection part 20 of the remote control 14 is operated, and a power source is applied by controlling a power source circuit by a channel selection controller 17. Thence, the receiving station switching part 18 of the remote control 14 is operated, and a receiving channel is switched to a desired one by controlling the tuning element of a tuner 1 by the channel selection controller 17. Moreover, the sound volume adjusting part 19 of the remote control 14 is operated, and a sound volume is set at a desired sound volume by controlling the sound volume control circuit 11 of the low frequency amplifier circuit 10 by the channel selection controller 17. In this way, the sound of a desired broadcast station received by the television receiver emitted from the remote control with built-in speaker 15 can be heard.

Japanese Patent Number 2001186578

Inventor: Young-min Kim, et al.

Issued: Jul. 6, 2001

PROBLEM TO BE SOLVED: To provide a wireless remote commander for an internet device incorporating a microphone and a speaker, where the remote controller can simply be utilized for wireless speech, a Karaoke functions are executed by utilizing microphone, and a voice can be heard through the speaker.

SOLUTION: A configuration related to a microcomputer or a remote controller for an internet device and its body consists of a body 3, comprising an infrared reception section 37 that receives an infrared ray signal and comprising an antenna transmission reception section 31 for sending/receiving a wireless frequency signal and of a remote controller 1 comprising an infrared transmission section 22 that transmits an infrared ray signal to remotely adjust the body 3, an antenna transmission reception 11, a key button 23' to enter various instruction words to the main body 3 and a track ball 23" which serves as a mouse.

International Patent Application Number WO01/47258

Inventor: Dean A. Kaufman

Issued: Jun. 28, 2001

A television receiver remote control system having a receiver for receiving audio signal portions of signals carrying television channels, an audio transmitter for transmitting the audio signal portion of a selected one of the channels received by the receiver, and a remote control for remote operation of the receiver to select the audio signal portion of a desired channel for transmission by the transmitter, and for remote operation of a TV. The remote control includes an audio receiver for wireless receipt of the audio signal portion of the selected channel transmitted by the transmitter, and an audio speaker for converting the received audio signal portion into sound. The system permits the audio signal portion of any selected channel to be listened to with the remote control via the speaker without changing a channel selected on an associated TV.

SUMMARY OF THE PRESENT INVENTION

The present invention relates generally to remote controls and, more specifically, to a remote control for an audio/video device, such as a television. The remote control has an audio circuit for receiving a wireless broadcast of an audio signal associated with at least one of a selected video program from the video monitor and selected audio program from an audio output device. Actuation of a button disables the relay of the audio signal through an output device and instead reroutes the signal to the remote control. The remote control includes a speaker to output the rerouted signal to the user, thus allowing for more private listening. The volume of the audio signal being transmitted through the speaker can be changed by the remote control. The remote control also includes an aperture for insertion of an earpiece, which upon insertion of an earpiece, causes the rerouted audio signal to be output to the earpiece.

A primary object of the present invention is to provide a remote control unit that overcomes the shortcomings of the prior art.

A secondary object of the present invention is to provide a remote control unit incorporating a speaker.

Another object of the present invention is to provide a remote control unit with volume control for the speaker.

Yet another object of the present invention is to provide a remote control unit having means for receiving a wireless audio signal from a audio/video communications device.

A further object of the present invention is to provide a remote control unit for varying the volume of the audio signal using additional remote control keys.

Still yet another object of the present invention is to provide a remote control unit whereby a user can position the hand held remote speaker in close proximity while viewing a video program negating the need for increasing the volume.

Another object of the present invention is to provide a remote control unit that provides for a user to hear an outputted audio signal without disturbing others.

Yet another object of the present invention is to provide a remote control unit for use by the hearing impaired to output the audio signal in close proximity to a user.

Still another object of the present invention is to provide a remote control unit for use by the visually impaired by audibly outputting the channel number when the station or channel is changed in close proximity to the user.

Yet another object of the present invention is to provide a remote control unit for use by the visually impaired that broadcasts the title of the program when the station is first observed.

Still yet another object of the present invention is to provide a remote control unit with a speaker and speaker volume control that can be used in conjunction with an existing audio-visual system to enhance the audible output of system.

Another object of the present invention is to provide a remote control unit able to receive a wirelessly broadcasted an audio signal from an audio/video communications device wherein the remote control unit incorporates means for audibly reproducing said re-broadcasted audio/video communications audio signal and means for adjusting the volume.

Yet another object of the present invention is to provide a remote control unit having an optional port for receiving an ear piece therein affording the user total listening privacy.

Still another object of the present invention is to provide a remote control unit that is simple and easy to use.

Still yet another object of the present invention is to provide a remote control unit that is inexpensive to manufacture and operate.

The present invention overcomes the shortcomings of the prior art by providing a remote control for a an audio-video device, such as a television, incorporating an audio circuit for receiving a wireless broadcast of an audio signal associated with a selected video program from the video monitor including means for varying the volume of the signal through a provided speaker formed integral with the remote control.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
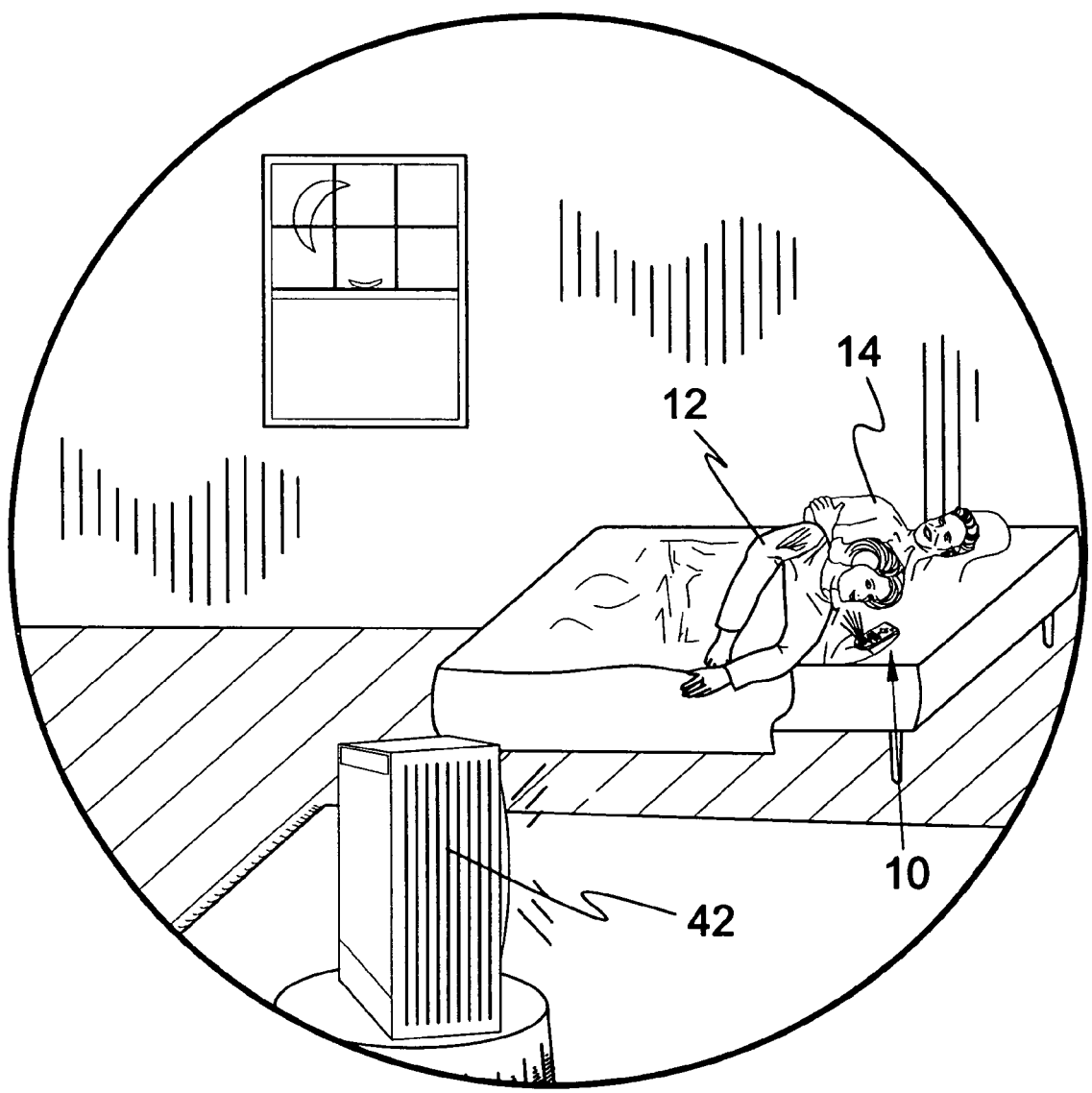
FIG. 1 is an illustrative view of a remote control unit of the present invention in use.

Turning now descriptively to the drawings, in which similar reference characters denote similar elements throughout the several views, the Figures illustrate the remote control unit of the present invention. With regard to the reference numerals used, the following numbering is used throughout the various drawing Figures.

10 remote control unit of the present invention
12 user
14 non-user
16 audio source
18 power button
19 minus volume button
20 plus volume button
22 plus channel button
23 minus channel button
24 digit buttons
26 mute button
27 right side of remote
29 left side of remote
30 last button
31 top end of housing
32 remote housing
33 bottom end of housing
34 speaker
35 face of housing
36 ear piece aperture
38 plus remote audio button
39 minus remote audio button
40 video/audio signal
42 television
43 video/audio signal
44 television video signal
46 television display monitor
48 television audio signal
50 television transceiver
52 television volume control processor
54 television speaker
56 second transceiver
58 remote audio signal
60 remote volume control
66 signals received
68 request signal
70 power control signals
72 channel select on signals
74 audio request signals
76 television audio control
78 remote audio control
80 first switch
82 second switch
84 audio signal processor
85 function buttons

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments. Practitioners skilled in the art will recognize numerous other embodiments as well. For definition of the complete scope of the invention, the reader is directed to appended claims.

Turning now descriptively to the drawings, in which similar reference characters denote similar elements throughout the several views, FIGS. 1 through 8 illustrate a remote control unit of the present invention which is indicated generally by the reference numeral 10.

FIG. 1 is an illustrative view of the remote control unit 10 of the present invention in use. The remote control unit 10 includes a housing 32, having a plurality of functional buttons and a remote control speaker 34 are located on a face 35 thereof, which will be discussed hereinafter with reference to FIG. 3. Shown herein, a user 12 lays in bed watching a television 42. Typically a television 42 broadcasts the audio signal through at least one of a plurality of television speakers 54, shown in FIG. 5, that are formed integrally with the television 42, thus projecting the audio signal to the entire area. Herein, however, the user 12 has actuated the remote control unit 10 by pressing a mute button 26 on the face 35. Thus, the audio sounds normally transmitted through the television speakers 54, are now transmitted through the remote control speaker 34. The user 12 listens to the television 42 through the remote control speaker 34 so as not to awaken the sleeping non user 14.

The illustration shown herein represents just one operation of the remote control unit 10. The remote control unit 10 can be used or made to be used with any audio-visual device.

The remote control unit 10 of the present invention provides a number of advantages over the prior art. The remote control unit 10 aids people who are hearing impaired by allowing them to position the remote control unit 10 near their ears to better hear a signal being output thereby. The remote control unit 10 also aids the visually impaired by at least one of audibly outputting the channel name, channel number when the channel is changed and also by audibly outputting, upon changing the channel, the title of the program that is playing on the channel. The remote control unit 10 prevents the user 12 from disturbing others in the same area by redirecting the audio output proximate to the user. The remote control unit 10 also provides allows the user 12 to use an earpiece thus affording users 12 complete listening privacy as the audible output could be heard only through the earpiece.

Figure 2:
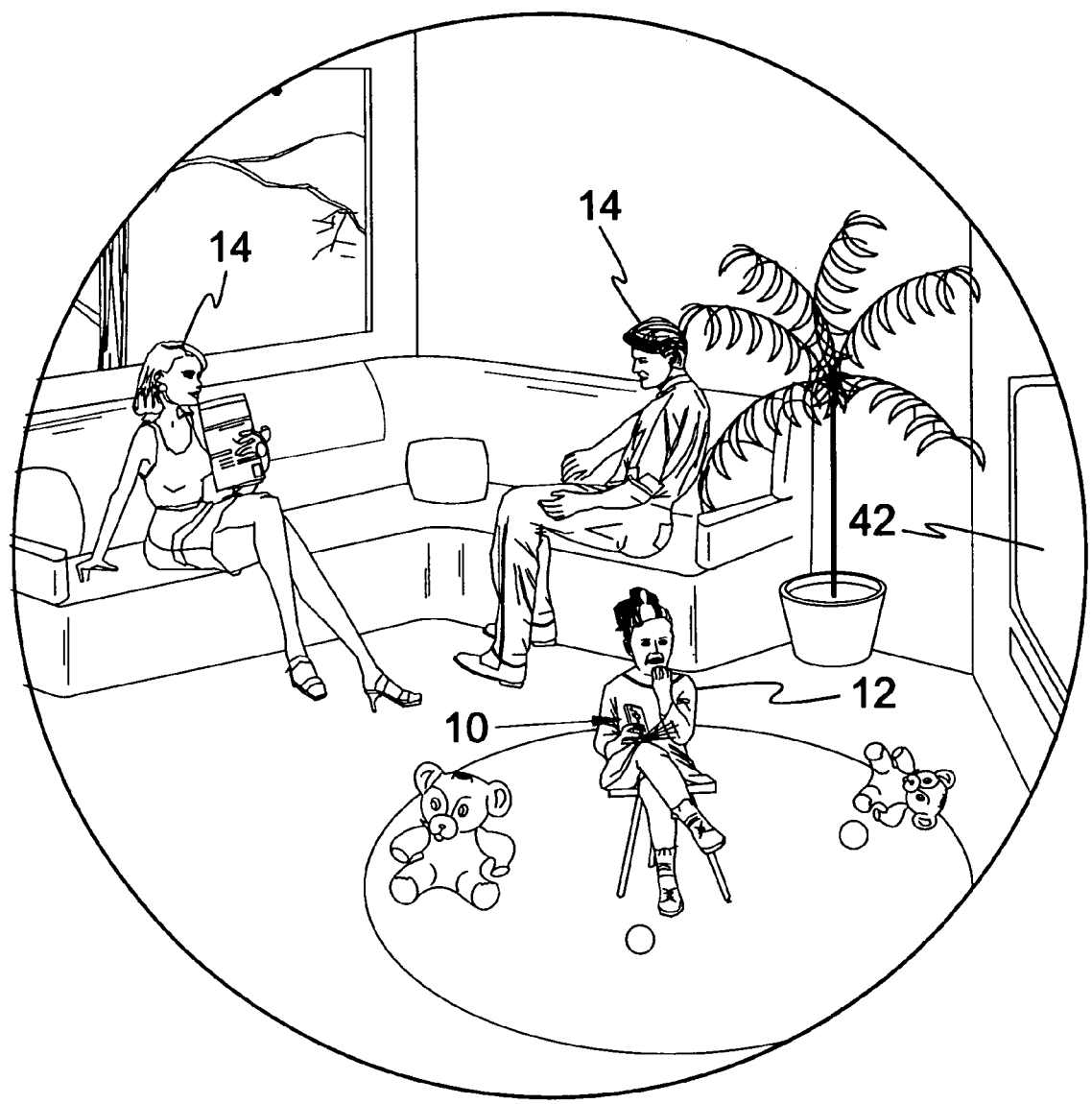
FIG. 2 is an illustrative view of a remote control unit of the present invention in use.
Figure 5:
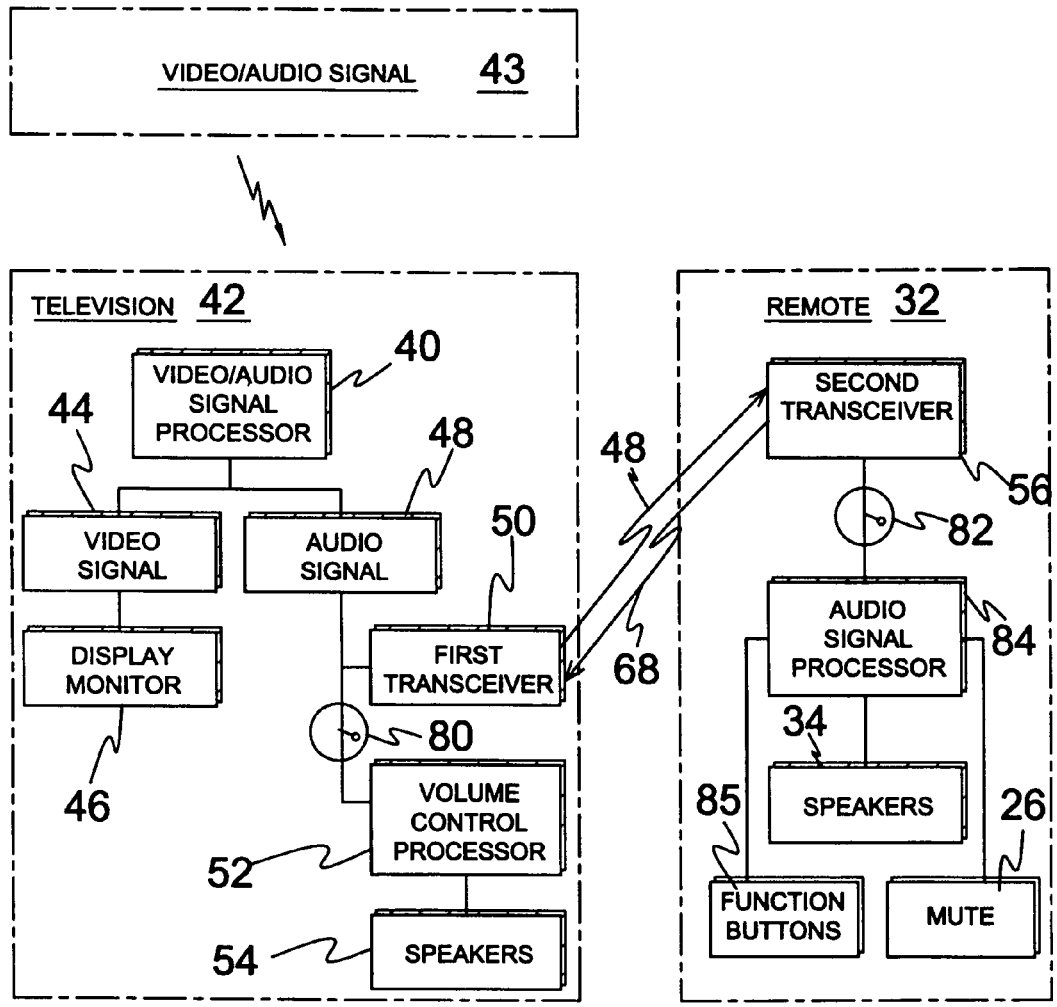
FIG. 5 is a block diagram of a remote control unit of the present invention.

FIG. 2 is an illustrative view of the remote control unit 10 of the present invention in use. Shown herein, the non-users 14 are sitting on a couch reading and napping. The user 12 sits in the middle of the room watching the television 42. The user 12 has actuated the remote control unit 10 in a manner that will be discussed hereinafter. Thus, the audio sounds normally transmitted through the television speakers 54, shown in FIG. 5, are now transmitted through the remote control speaker 34. The user 12 holds the remote control unit 10 and listens to the audio sounds from through the remote control speaker 34 without disturbing the non users 14. The user 12 also has the ability to change channels of the television 42 and adjust the volume of the remote control speakers 34. When the user 12 changes channels, the remote control unit 10 states through the remote control speakers 34 the name of the new channel and the title of the program on the new channel.

Figure 3:
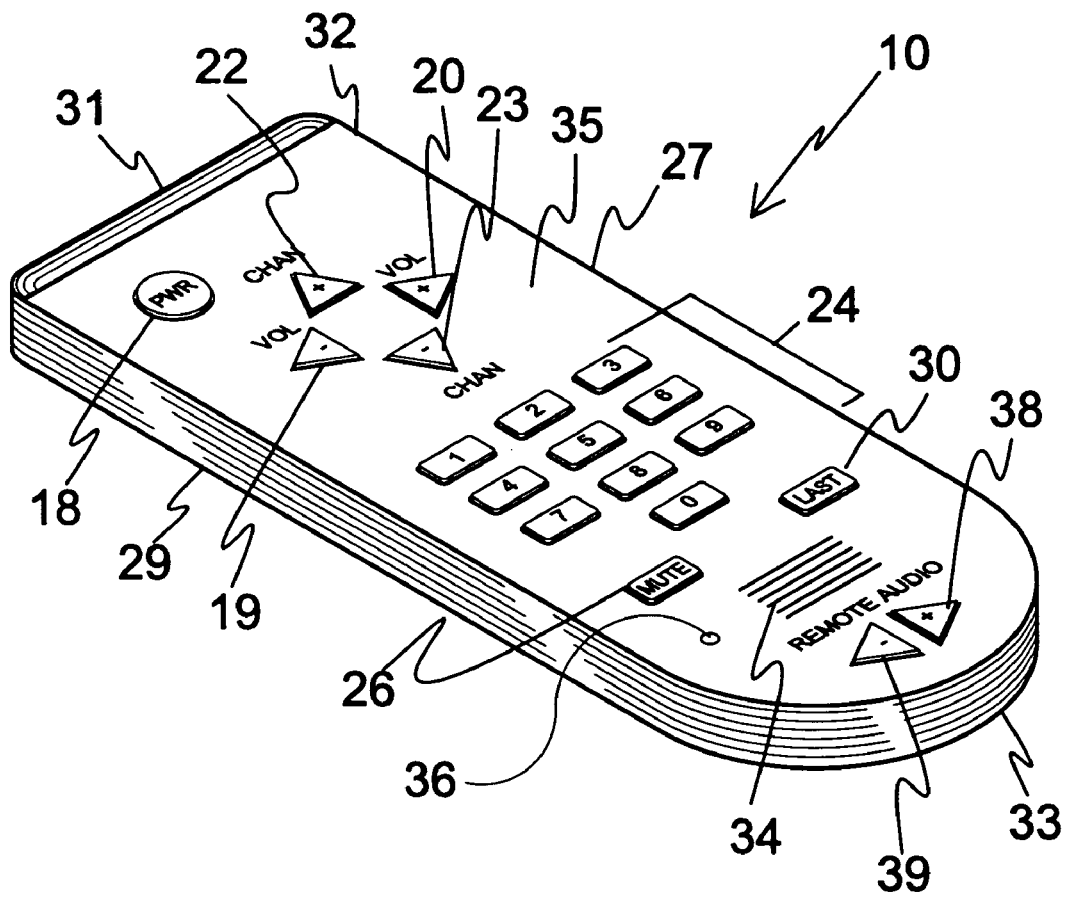
FIG. 3 is a perspective view of a remote control unit of the present invention.

FIG. 3 is a perspective view of the remote control 10 of the present invention. The remote control unit 10 includes a housing 32, having a top end 31, a bottom end 33, a right side 27, a left side 29, and a face 35. The remote unit 10 includes a plurality of function buttons and the remote control speaker 34 located on the face 35 of the housing 32. Adjacent to the top end 31 is a power button 18. Below the power button 18, a pair of channel buttons 22, 23 and a pair of volume buttons 19, 20 are centrally located on the face 35. The buttons are triangularly shaped, but may be formed in any geometric shape. The buttons 19,20,22,23 are arranged such that the interior space between all four buttons forms a square with the plus channel button 22 located opposite from the minus channel button 23 along a vertical axis and the plus volume button 20 located opposite from the minus volume button 19 along a horizontal axis. The positioning is described for purposes of example only and the buttons can be on either the horizontal or vertical axis. A plurality of digit buttons 24 are located below the volume 19, 20 and channel 22, 23 buttons. The digit buttons 24 are arranged like the numbers on a telephone. The remote speaker 34 is positioned below the mute 26 and last 30 buttons and an ear piece aperture 36 is located adjacent thereto. The remote control unit 10 further includes an audio increase button 38 and an audio decrease button 39 located adjacent to the remote speaker 34.

The remote control unit 10 of the present invention includes the functionality of a standard remote control that is commonly used with audio-visual electronic devices. Examples of audio-visual devices having remote controls include but are not limited to televisions, VCRs and DVD players.

To engage the inventive features of the remote control unit 10, the user 12 depresses the mute button 26. Depression of the mute button 26 causes the signal representing audio data that is conventionally output through the television speakers 54, shown in FIG. 5, to instead be transmitted for receipt by the remote control unit 10 of the present invention. Upon receipt by the remote control unit 10, the signal representing audio data is audibly output by the speaker 34. A volume level of the signal output by the remote speaker 34 is selectively controllable via buttons 38 and 39. The increase remote audio button 38 increases the volume level of the sound output from the remote control speaker 34. The decrease remote audio button 39 decreases the volume level of the sound output from the remote control speaker 34. Alternatively, the user 12 can insert an earpiece into the ear piece aperture 36, thereby causing the signal received from the television 42 by the remote control unit 10 to be audibly output through the earpiece instead of through the remote control speaker 34.

Additionally, after the mute button 26 has been depressed, the depression of the other functionality buttons causes an audible output corresponding to the selected action to be broadcast through the remote control speaker 34 or earpiece accordingly. For example, after depressing the mute button 26, the television 42, as shown in FIG. 1, is outputting a signal corresponding to a first channel through the remote control speaker 34. The user 12 can selectively change the channel to a second channel by depressing the increase channel button 22. The remote control speaker 34 audiblizes a data signal corresponding to the second channel including a channel identifier and a title of the current program on the second channel as well as the audio data for the second program.

Figure 4:
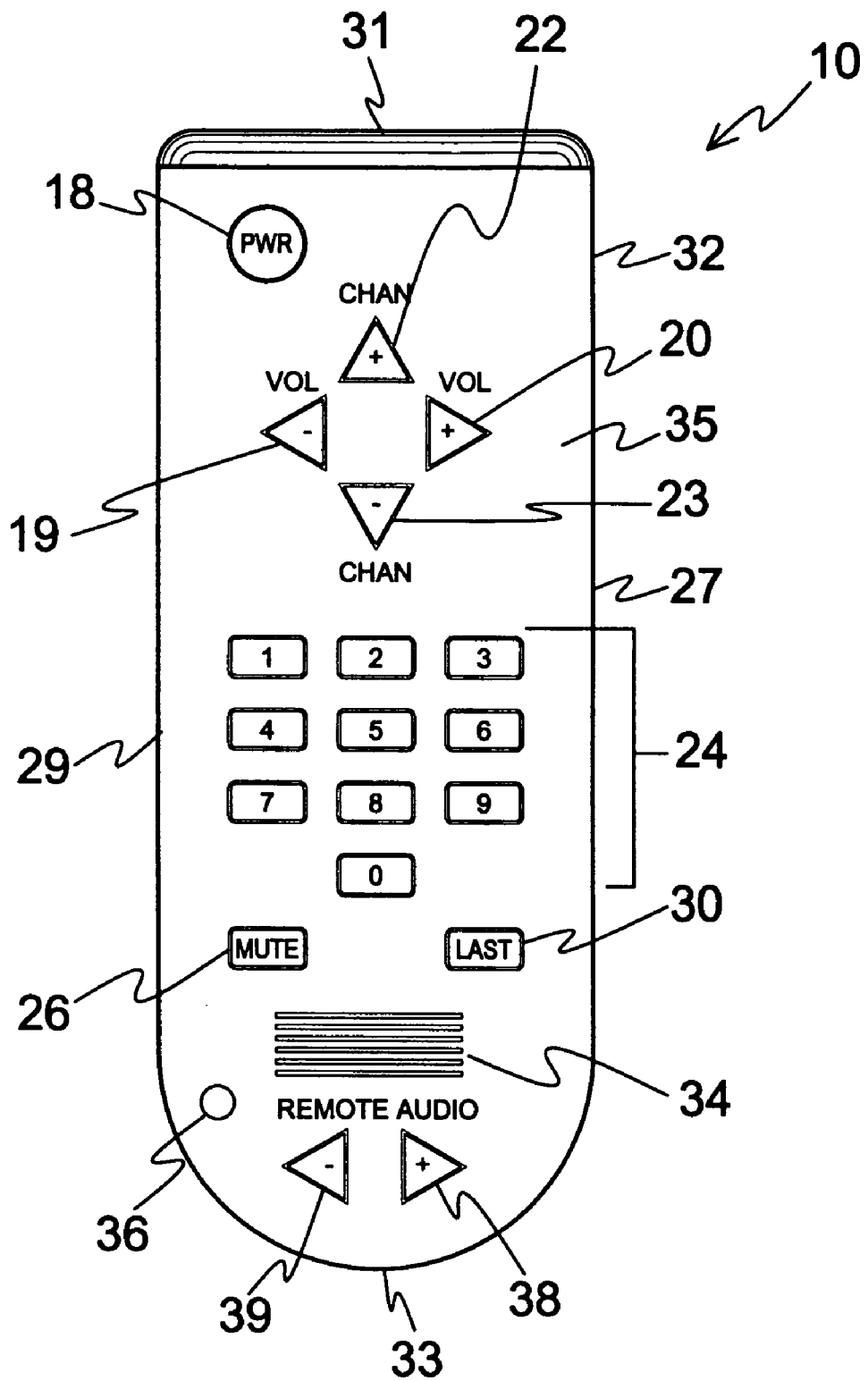
FIG. 4 is a perspective view of the face of a remote control unit of the present invention.

FIG. 4 is a perspective view of the face 35 of the remote control unit 10 of the present invention. The remote control unit 10 includes the housing 32, having the top end 31, the bottom end 33, the right side 27, the left side 29, and the face 35. The plurality of functional buttons and the remote control speaker 34 are located on the face 35. Adjacent to the top end 31 is the power button 18. Below the power button 18, the pair of channel buttons 22, 23 and the pair of volume buttons 19, 20 are centrally located on the face 35. The buttons are triangularly shaped, but may be formed in any geometric shape. The buttons 19,20,22,23 are arranged such that the interior space between all four buttons forms a square with the plus channel button 22 located opposite from the minus channel button 23 along the vertical axis and the plus volume button 20 located opposite from the minus volume button 19 along the horizontal axis. The positioning is described for purposes of example only and the buttons can be on either the horizontal or vertical axis. The plurality of digit buttons 24 are located below the volume 19, 20 and channel 22, 23 buttons. The digit buttons 24 are arranged like the numbers on a telephone. The remote speaker 34 is positioned below the mute 26 and last 30 buttons and the ear piece aperture 36 is located adjacent thereto. The remote control unit 10 further includes the audio increase button 38 and the audio decrease button 39 located adjacent to the remote speaker 34.

The remote control unit 10 of the present invention includes the functionality of a standard remote control that is commonly used with audio-visual electronic devices. Examples of audio-visual devices having remote controls include but are not limited to televisions, VCRs and DVD players.

To engage the inventive features of the remote control unit 10, the user 12 depresses the mute button 26. Depression of the mute button 26 causes the signal representing audio data that is conventionally output through the television speakers 54, shown in FIG. 5, to instead be transmitted for receipt by the remote control unit 10 of the present invention. Upon receipt by the remote control unit 10, the signal representing audio data is audibly output by the speaker 34. A volume level of the signal output by the remote speaker 34 is selectively controllable via buttons 38 and 39. The increase remote audio button 38 increases the volume level of the sound output from the remote control speaker 34. The decrease remote audio button 39 decreases the volume level of the sound output from the remote control speaker 34. Alternatively, the user 12 can insert an earpiece into the ear piece aperture 36, thereby causing the signal received from the television 42 by the remote control unit 10 to be audibly output through the earpiece instead of through the remote control speaker 34.

Additionally, after the mute button 26 has been depressed, the depression of the other functionality buttons causes an audible output corresponding to the selected action to be broadcast through the remote control speaker 34 or earpiece accordingly. For example, after depressing the mute button 26, the television 42, as shown in FIG. 1, is outputting a signal corresponding to a first channel through the remote control speaker 34. The user 12 can selectively change the channel to a second channel by depressing the increase channel button 22. The remote control speaker 34 audiblizes a data signal corresponding to the second channel including a channel identifier and a title of the current program on the second channel as well as the audio data for the second program.

FIG. 5 is a block diagram of the remote control unit 10 of the present invention. A video/audio signal 43 is transmitted to the television 42. In the television 42, a video/audio signal processor 40 is connected to a video monitor 46, a first transceiver 50 and a volume control processor. The video/audio signal processor 40 separates the video/audio signal 43 into a television video signal 44 and a television audio signal 48. The video/audio control processor 40 causes the television video signal 44 to be output by the display monitor 46. Positioned in series between the first transceiver 50 and the volume control processor 52 is a first switch 80. When the first switch 80 is in a first closed position, the video/audio signal processor causes the television audio signal 48 to be transmitted to each of the first transceiver 50 and a television volume control processor 52. The television volume control processor 52 causes the television audio signal 48 to be output to the television speakers 54. When the first switch 80 is in a second open position, as will be discussed hereinafter, the television audio signal 48 is only transferred to the first transceiver 50.

The remote control unit 32 includes an audio signal processor 84 which is connected to a second transceiver 56 and a speakers 34, function buttons 85 and an activation (mute) button 26. Positioned between the audio signal processor 84 and the second transceiver 56 is a second switch 82. When the mute button 26 on the remote control unit 10 has been depressed, the audio signal processor 84 causes the second switch 82 to move from a first open position to a second closed position thereby completing a circuit. Additionally, depression of the mute button 26 causes the audio signal processor 84 to generate a request signal and further cause the second transceiver 56 to transmit the request signal 68. to the request signal 68 is received by the first transceiver 50 which causes the first switch 80 to move from the first closed position to the second open position thus preventing the audio signal 48 being output through the television speakers 54.

Upon opening of the first switch 80, the first transceiver 50 transmits the audio signal 48 for receipt by the second transceiver 56. The audio signal processor 84 detects that the audio signal 48 has been received by the second transceiver 56 and causes the received audio signal to be output by the remote speaker 34.

Additionally, when a user depresses one of the plurality of function buttons 85 as described hereinabove with respect to FIGS. 3 and 4, the audio signal processor 84 generates additional request signals corresponding to the action selected and these additional request signals are transmitted by the second transceiver 56 for receipt by the first transceiver 50. The video/audio signal processor 40 then detects the nature of the additional request signals and operates to satisfy these requests. Examples of additional request signals include but are not limited to channel change, data requisition for associated channel and/or program data and the like. In satisfying these requests, the video/audio processor 40 causes the first transceiver 50 to transmit data signals representing the requested information for output by the remote speaker 34.

Figure 6:
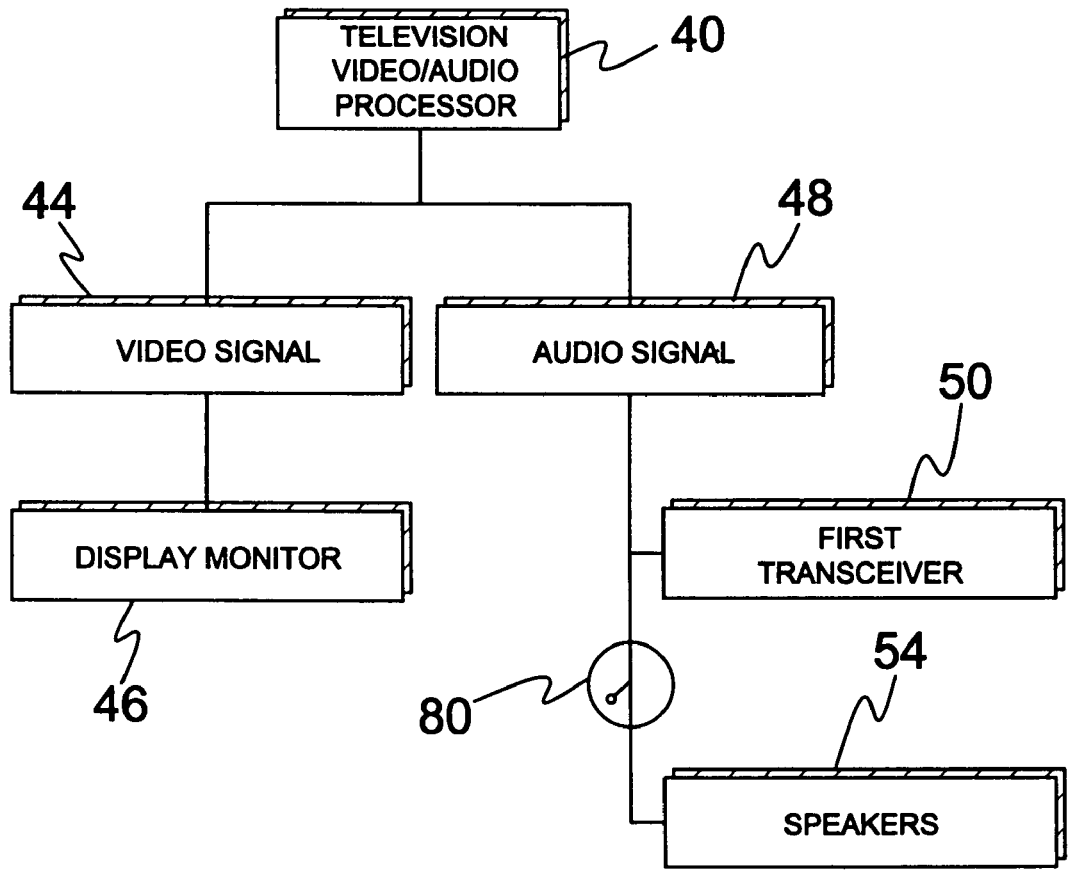
FIG. 6 is a block diagram of the television video/audio signal of a remote control unit of the present invention.

FIG. 6 is block diagram of the TV video/audio signal processor 40 of the remote control unit 10 of the present invention. The television 42 includes the video/audio signal processor 40 is connected to the video monitor 46, the first transceiver 50 and the speakers 54. The first switch 80 is positioned between the first transceiver and the speakers 54. The video/audio signal processor 40 separates the video/audio signal 43 into a television video signal 44 and a television audio signal 48. The video/audio control processor 40 causes the television video signal 44 to be output by the display monitor 46. When the first switch 80 is in a first closed position, the video/audio signal processor causes the television audio signal 48 to be transmitted to each of the first transceiver 50 and to be output by the speakers 54. When the first switch 80 is in a second open position, which is discussed hereinabove with specific reference to FIG. 5, the television audio signal 48 is only transferred to the first transceiver 50.

Figure 7:
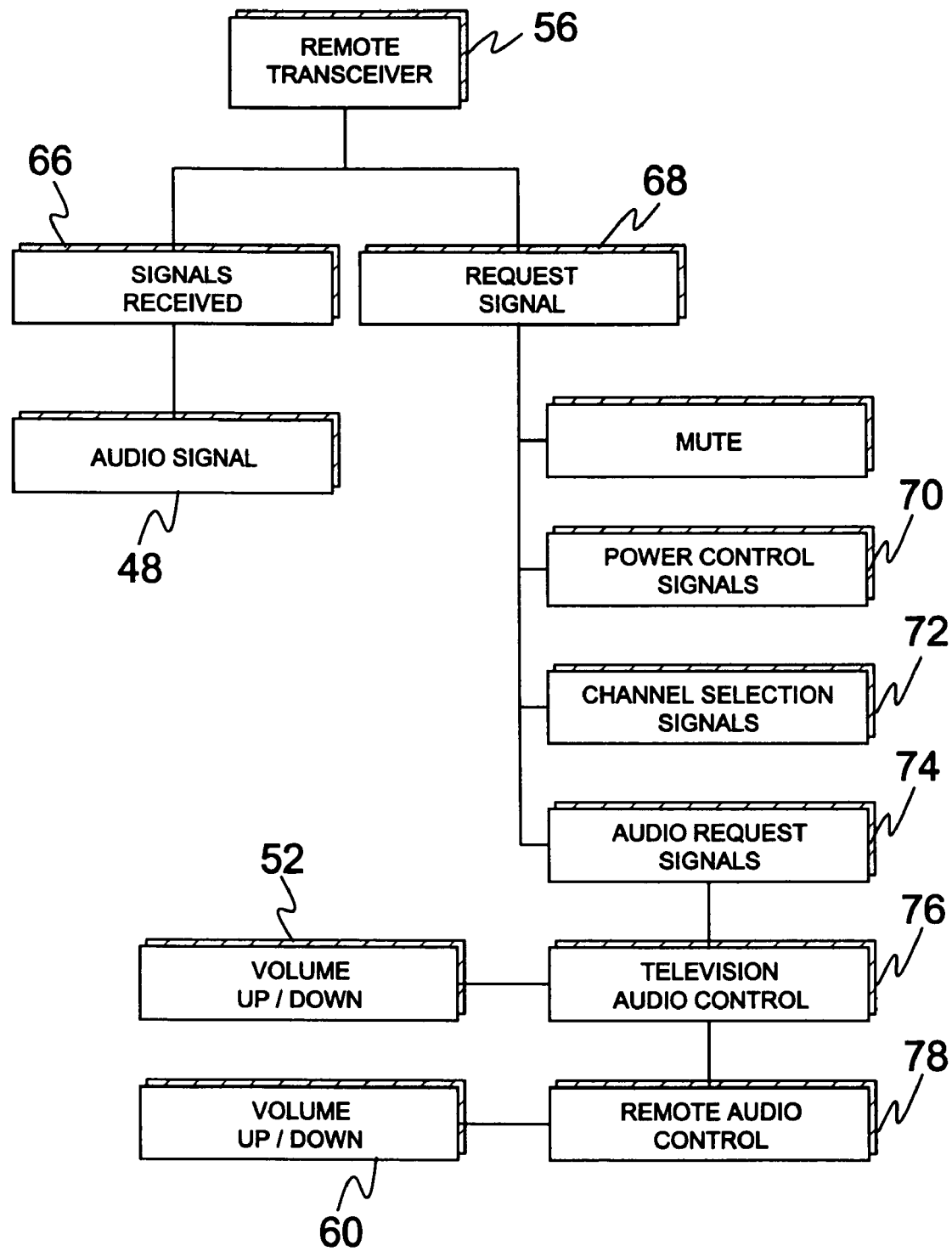
FIG. 7 is a block diagram of a remote transceiver of a remote control unit of the present invention.

FIG. 7 is a block diagram of a remote transceiver 56 of the remote control 10 of the present invention. The remote transceiver 56 is able to receive signals 66 such as the audio signal 48. Additionally, the remote transceiver 56 is able to transmit a plurality of request signals 68. A first signal transmitted by the second transceiver 56 as a request signal 68 is a mute signal 26 which selectively causes the present invention to be operational as discussed hereinabove with respect to FIG. 5. The signals transmitted 68 include a power control signal 70 for selecting the operational status of the audio-visual device to with which the remote control unit 10 communicates. A channel selection signal 72 for determines which channel is selected is also selectively transmitted by the second transceiver. Another request signal 68 is an audio request signal 74 which includes a television audio control 76, having television volume control 52 for selectively increasing and decreasing the volume of the television and a remote audio control 78 having remote volume control 60 for selectively increasing and decreasing the volume of the remote speaker 34.

Figure 8:
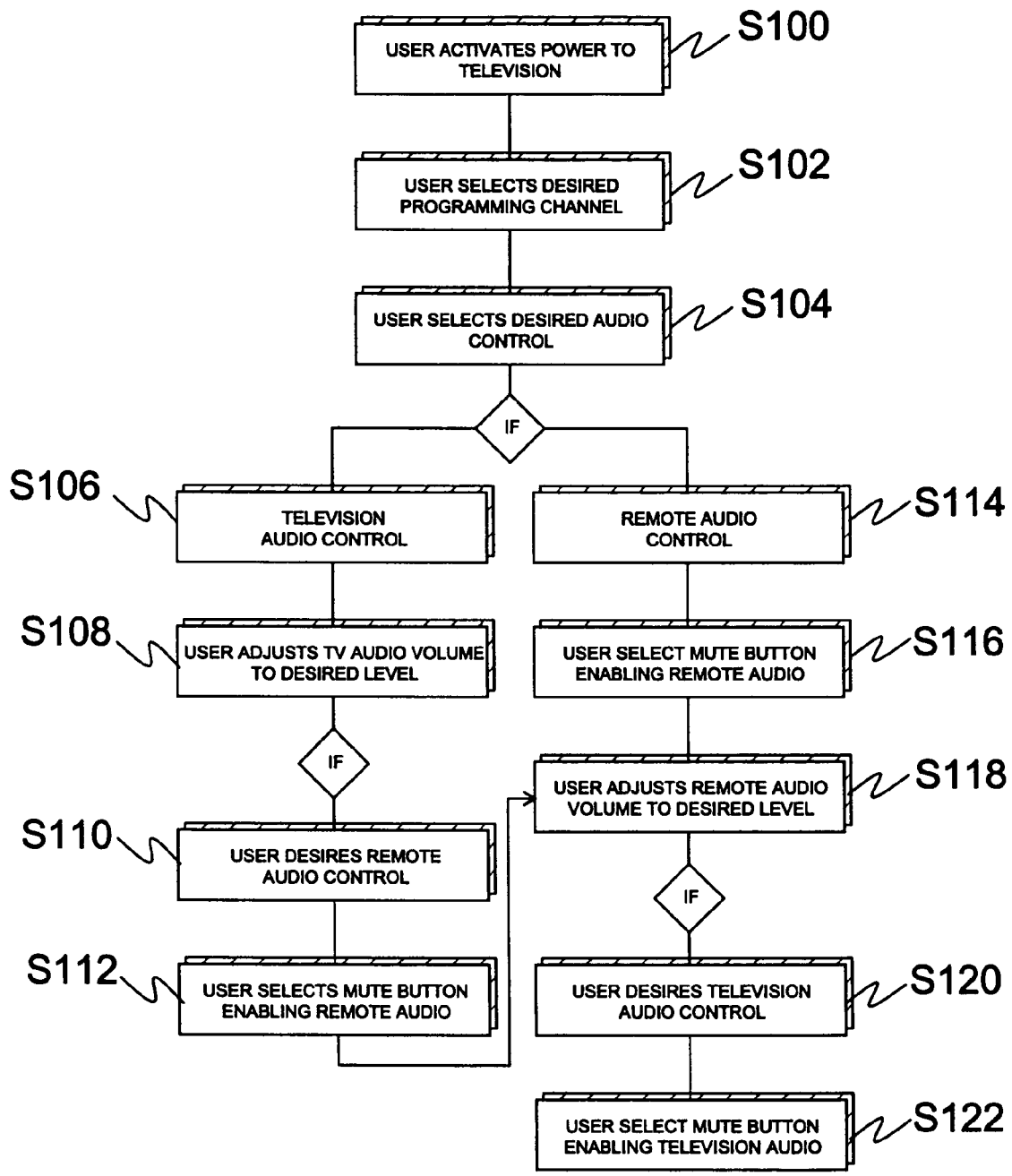
FIG. 8 is a flow chart of the remote control unit of the present invention in use.

FIG. 8 is a flow chart of the remote control 10 of the present invention. In step S100, the user activates the power to the television. The user then selects the desired programming channel in step S102. In step S104, the user selects the desired audio control. If the user selects television audio control as in step S106, the user can then adjust the audio volume of the television to a desired level as per step S108. If the user desires remote audio control as per step S110, the user selects the mute button enabling the remote audio as in step S112. Thereafter, in step S118, the user is then able to adjust the remote audio volume to a desired level. If then the user desires television audio control as in step S120, the user must select the mute button enabling television audio as in step S122. If, however, the determination is made in step S104 results in the user desiring remote audio control as in step S114, the user must select the mute button to enable the remote audio as in step S116. Thereafter, the system proceeds to steps S118-S122 as described hereinabove.

It will be understood that each of the elements described above, or two or more together may also find a useful application in other types of devices differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A volume control system for use with an audio-visual component able to receive an input signal having an audio signal and a video signal comprising:
   a) a remote control unit having a speaker positioned thereon for outputting an audio signal therefrom;
   b) a mute button on said remote control unit for generating a request signal for disabling an output of said audio signal by said component and to transmit said audio signal for receipt by a receiving means in said remote control unit;
   c) means in said remote control unit for outputting a received audio signal on said speaker;
   d) said remote control unit having two sets of volume control buttons, one set for controlling volume of sound from said audio-visual component, and the second set for controlling volume of sound from said speaker on said remote control unit; and
   e) said mute button on said remote control unit being a toggle switch whereby pressing said mute button again returns audio output to said audio-visual component and wherein said speaker on said remote control unit audibly outputs channel name, channel number, and title of a program being heard upon changing of a channel included in said received data signal when outputting a received audio signal on said speaker.

2. The system as recited in claim 1, wherein said audio-visual component includes a first transceiver for receiving and transmitting signals from and to said remote control unit.

3. The system as recited in claim 2, wherein said remote control unit has a second transceiver for transmitting and receiving signals to and from said audio-visual component.

4. The system as recited in claim 3, wherein said audio signal transmitted to said remote control unit is accompanied by a data signal having data corresponding to said transmitted audio signal.

5. The system as recited in claim 4, wherein said data signal comprises at least one of a channel identifier, a program guide, a channel guide, a program name, and program information.

6. The system as recited in claim 5, wherein said remote control further comprises means for audiblizing said received data signal for output by said speaker.

7. The system as recited in claim 6, wherein said remote control unit includes an output port whereby a user can redirect audio sent to said remote control unit to a personalized listening device jacked into said output port to provide total listening privacy.

8. The system as recited in claim 7, wherein said two sets of volume controls on said remote control unit are located on opposite ends thereof, the second set being adjacent the speaker.

* * * * *